United States Patent
Edwards et al.

(10) Patent No.: US 8,726,173 B2
(45) Date of Patent: May 13, 2014

(54) ENABLING BROWSER BASED APPLICATIONS THROUGH CUSTOMIZED TEMPORARY BROWSER PROFILES

(75) Inventors: Albert Mark Edwards, Cary, NC (US); Douglas Earl Hays, Nicholasville, KY (US)

(73) Assignee: International Business Machines Corporation, Armonk, NY (US)

(*) Notice: Subject to any disclaimer, the term of this patent is extended or adjusted under 35 U.S.C. 154(b) by 1908 days.

(21) Appl. No.: 10/973,123

(22) Filed: Oct. 26, 2004

(65) Prior Publication Data
US 2006/0101336 A1   May 11, 2006

(51) Int. Cl.
G06F 3/00 (2006.01)

(52) U.S. Cl.
USPC .......................................................... 715/760

(58) Field of Classification Search
USPC .................................. 715/700, 744–745, 760
See application file for complete search history.

(56) References Cited

U.S. PATENT DOCUMENTS

| | | |
|---|---|---|
| 5,761,662 A | 6/1998 | Dasan |
| 5,890,152 A | 3/1999 | Rapaport et al. |
| 6,433,794 B1 | 8/2002 | Beadle et al. |
| 2001/0049718 A1* | 12/2001 | Ozawa ........................... 709/203 |
| 2002/0052812 A1* | 5/2002 | Braverman ....................... 705/34 |
| 2002/0087625 A1* | 7/2002 | Toll et al. ........................ 709/203 |
| 2003/0120768 A1* | 6/2003 | Simpson ........................ 709/224 |
| 2003/0154126 A1* | 8/2003 | Gehlot et al. .................... 705/14 |
| 2004/0122949 A1* | 6/2004 | Zmudzinski et al. .......... 709/225 |
| 2004/0186882 A1* | 9/2004 | Ting .............................. 709/202 |
| 2006/0112102 A1* | 5/2006 | Shafron ............................ 707/9 |

* cited by examiner

Primary Examiner — Omar Abdul-Ali
(74) Attorney, Agent, or Firm — Steven M. Greenberg, Esq.; CRGO Law

(57) ABSTRACT

A method, system and apparatus for browser based enablement through customized temporary browser profiles. A method for enabling a browser based application through a customized temporary browser profile can include the following steps. First, responsive to a request to provide a browser based application to a content browser in a client computing device, a customized browser profile can be applied in lieu a default browser profile in the content browser. Subsequently, the browser based application can be loaded in the content browser and the customized browser profile can be deleted in temporal proximity to the loading step. Preferably, the applying step can include receiving wrapper logic in the content browser; and, executing the wrapper logic to configure the customized browser profile and to apply the customized browser profile to the content browser.

18 Claims, 2 Drawing Sheets

ENABLING BROWSER BASED APPLICATIONS THROUGH CUSTOMIZED TEMPORARY BROWSER PROFILES

BACKGROUND OF THE INVENTION

1. Statement of the Technical Field

The present invention relates to the field of browser based application management and more particular to enablement of browser based applications by modifying browser profiles.

2. Description of the Related Art

Prior to the popularization of the Internet and the subsequent implementation of the World Wide Web ("the Web"), software publishers typically distributed computer applications via storage media such as a computer diskette or compact disc. Initially, such stand-alone computer applications included underlying program logic, data storage and, optionally, a user interface. Recently, given the popularization of the Internet and the Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as browser based applications which can include a collection of hypermedia documents such as Web pages which can be viewed in hypermedia content browsers such as Web browsers.

In the case of a Web application, users can interact with the underlying program logic not through a traditional GUI, but through a GUI provided by GUI elements embedded in a hypermedia document displayed in a content browser. Conventional markup can be visually presented through use of a content browser. Content browsers process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup.

Difficulties can arise in distributing a browser based application as many types of content browsers have been fielded among the consuming public. Though most browsers can accommodate the majority of attribute tags defining the user interface of a browser based application (and even some simplified, embedded logic), differences in handling arise in respect to the incorporation of script logic such as JavaScript which make use of internal browser application programming interface (API) calls For example, it is well-known to utilize internal browser API calls to access the local file system and to execute arbitrary commands.

The use of internal browser API calls to access the local file system and other arbitrary commands can require the cooperation of the browser and the host device. To the extent that the browser and host device permit, internal API calls can execute without restriction. Yet, given the heightened concerns regarding application security and network intrusions, many host devices and browsers have been configured by default to block access to the local file system and to prevent the execution of many arbitrary commands. Thus, some reconfiguration of the browser can be required in order to permit the operation of a browser based application. Nevertheless, it is not reasonable to expect the end-user to reconfigure a browser whenever the end user intends to use a browser based application. Accordingly, browser based applications have not be deployed widely in uncontrolled end user environments.

SUMMARY OF THE INVENTION

The present invention addresses the deficiencies of the art in respect to browser based application enablement and provides a novel and non-obvious method, system and apparatus for browser based enablement through customized temporary browser profiles. In a specific aspect of the present invention, a method for enabling a browser based application through a customized temporary browser profile can include the following steps. First, responsive to a request to provide a browser based application to a content browser in a client computing device, a customized browser profile can be applied in lieu a default browser profile in the content browser. Subsequently, the browser based application can be loaded in the content browser and the customized browser profile can be deleted in temporal proximity to the loading step.

Preferably, the applying step can include receiving wrapper logic in the content browser; and, executing the wrapper logic to configure the customized browser profile and to apply the customized browser profile to the content browser. In this regard, the executing step can include configuring the customized browser profile to permit file system access; and, applying the customized browser profile to the content browser. The configuring step also can include further configuring the customized browser profile to enable scripts in the content browser. The configuring step yet further can include the step of further configuring the customized browser profile to permit access to an internal API for the content browser A system for enabling a browser based application through a customized temporary browser profile can include wrapper logic associated with a browser based application. The wrapper logic can define a customized content browser profile to replace a default content browser profile for a content browser when the browser based application is invoked. The system also can include deletion logic disposed in the browser based application. The deletion logic can be programmed to delete the customized content browser profile when the browser based application is loaded in the content browser. Notably, the customized content browser profile can include a setting specifying file system access permission and a setting specifying script enablement.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for enabling browser based applications through customized temporary browser profiles. In accordance with the present invention, in response to a request to activate a browser based application, wrapper logic can be forwarded to the content browser requesting the browser based application. Subsequently, the wrapper logic can execute which can configure and apply a customized browser profile to the content browser in lieu of the default browser profile. As part of the configuration, the browser profile can specify access to the underlying file system of the content browser. Accordingly, upon activating the requested browser based application, the customized browser profile can be deleted so as to prevent unfettered access to the customized browser profile in lieu of the default browser profile.

Figure 1:
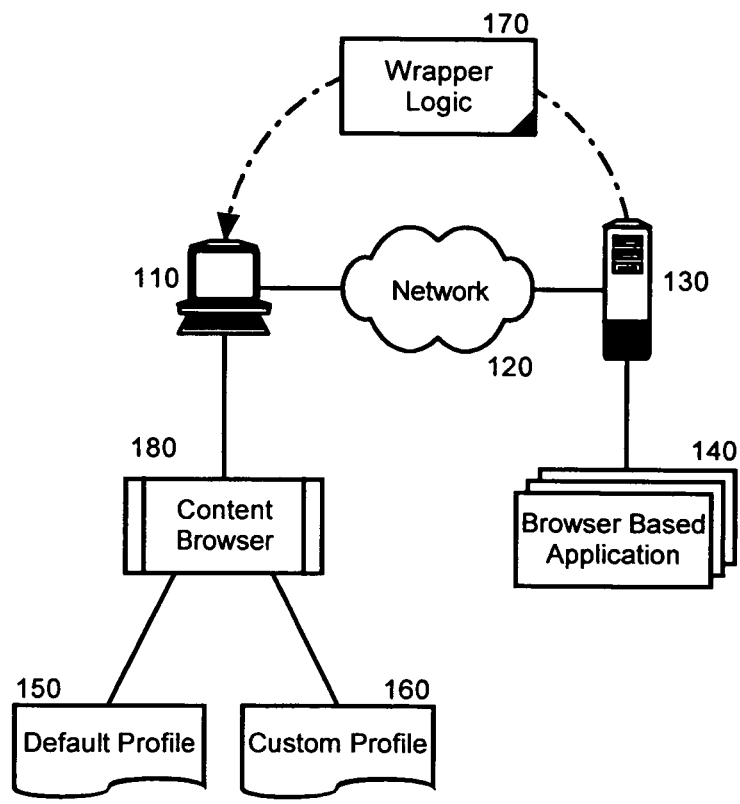
FIG. 1 is a schematic illustration of a system configured to enable a browser based application through a customized temporary browser profile; and, FIG. 2 is a flow chart illustrating a process for enabling a browser based application through a customized temporary browser profile.

In more particular illustration, FIG. 1 is a schematic depiction of a system configured to enable a browser based application through a customized temporary browser profile. The system can include a server computing device 130 coupled to one or more client computing devices 110 over a computer communications network 120 (only a single client computing device shown for purposes of illustrative simplicity). The server computing device 130 can include a configuration for hosting a browser based application 140 such as a Web application. In this regard, the browser based application 140 can be served on demand to requesting ones of the client computing devices 110 through respective content browsers 180 as it is well-known in the art.

The content browsers 180 disposed within the respective ones of the client computing devices 110 can operate according to a default browser profile 150. The default browser profile 150 can specify a default configuration of the content browser 180 including whether or not frames are enabled, whether scripting logic is enabled, and security matters such as whether particular warnings are to be issued when entering and leaving a secure session, and whether access to the underlying file system of the client computing device 110 is to be permitted. The skilled artisan will note, however, that the foregoing listing is not known to be a complete listing and many configuration parameters can be specified through the default browser profile 150.

In operation, upon a client computing device 110 requesting access to the browser based application 140 through the content browser 180, wrapper logic 170 can be provided to the content browser 180 prior to forwarding the browser based application 140. The wrapper logic 170 can create a customized browser profile 160 to be applied to the content browser 180 in lieu of the default profile 150. Subsequently, the browser based application 140 can be provided to the content browser 180. Moreover, as an initial measure, the customized browser profile 160 can be deleted such that one cannot enjoy unfettered access to the customized browser profile 160 after the customized browser profile 160 has been applied to enable the browser based application 140 in the content browser 180.

In a specific aspect of the present invention, the customized browser profile 160 can specify content browser 180 settings as follows:
1. Allow access to the file system and the internal browser APIs;
2. Enable browser frames;
3. Enable script processing;
4. Disable script security;
5. Disable secure session warnings;
6. Disable weak security warnings;
7. Disable mixed page warnings;
8. Disable insecure submission warnings;
9. Disable remember sign-ons;
10. Disable update notifications;
11. Add static root to bookmarks; and,
12. Set an initial character set.

Optionally, a content style sheet or comparable mechanism can be specified to generate a user interface look-and-feel of the content browser so as to appear more like a stand-alone application.

Figure 2:
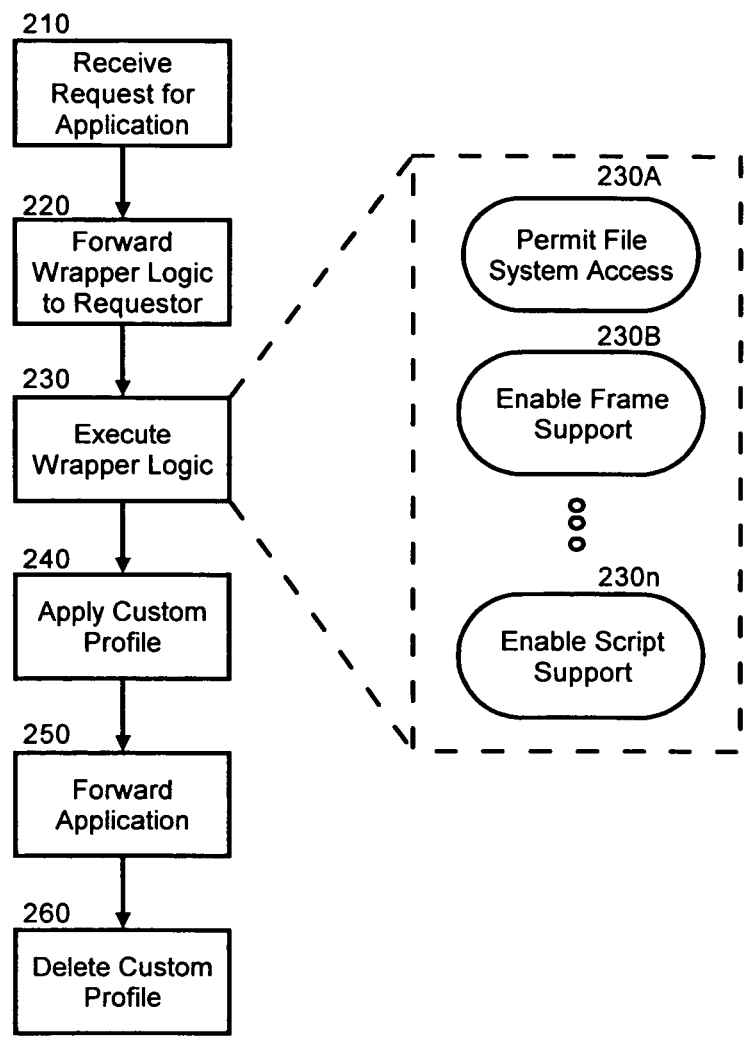

In more particular illustration, FIG. 2 is a flow chart showing a process for enabling a browser based application through a customized temporary browser profile. Beginning in block 210, a request can be received for a browser based application. In block 220, initially wrapper logic can be provided to the requester. Subsequently, in block 230 the wrapper logic can be executed in the content browser of the requestor. Notably, the execution of the wrapper logic can result in the establishment of a customized browser profile. The customized browser profile can specify, as an example, file system access permission 230A, frame support enablement 230B and script support enablement 230n, to name only a few configuration settings.

In block 240, the customized browser profile can be applied to the content browser so as to supplant the settings of the default configuration of the default profile with the settings of the customized browser profile. Subsequently, in block 250 the requested browser based application can be provided to the content browser. Finally, in block 260, the customized browser profile can be deleted. Significantly, because the customized browser profile is created and deleted within a short time span, the ordinary browsing experience known to the end user will not be perceptibly affected by the operation of the wrapper logic and the browser based application will be enabled to access the internal functions of the content browser and the file system of the host client computing device. For instance, the browser based application will be free to run install wizards packaged with the browser based application that otherwise will not run in view of the typical security settings of the default browser profile.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for enabling a web application through a customized temporary browser profile comprising the steps of:
   receiving a request for loading a web application to a content browser in a client computing device;
   in response to the request, creating a customized temporary browser profile in said content browser for enabling the requested web application;
   loading said requested web application to said content browser using the created customized temporary browser profile in lieu of a default browser profile in the content browser; and,
   deleting said created customized temporary browser profile in temporal proximity to said loading step.

2. The method of claim 1, further comprising the steps of:
   receiving wrapper logic in said content browser; and,
   executing said wrapper logic to configure said customized browser profile and to apply said customized browser profile to said content browser.

3. The method of claim 2, further comprising the steps of:
   configuring said customized browser profile to permit file system access; and,
   applying said customized browser profile to said content browser.

4. The method of claim 3, wherein said configuring step further comprises the step of further configuring said customized browser profile to enable scripts in said content browser.

5. The method of claim 3, wherein said configuring step further comprises the step of further configuring said customized browser profile to permit access to an internal application programming interface (API) for said content browser.

6. The method of claim 3, wherein said configuring step further comprises the step of further configuring said customized browser profile to enable frames in said content browser.

7. The method of claim 3, wherein said configuring step further comprises the step of further configuring said customized browser profile to disable security warnings for said content browser.

8. The method of claim 2, further comprising the step of applying a pre-programmed look-and-feel to said content browser.

9. The method of claim 8, wherein said step of applying a pre-programmed look-and-feel comprises the step of applying a content style sheet to said content browser.

10. A machine readable storage having stored thereon a computer program for enabling a web application through a customized temporary browser profile, the computer program comprising a routine set of instructions which when executed by a machine cause the machine to perform the steps of:
    receiving a request for loading a web application to a content browser in a client computing device;
    in response to the request, creating a customized temporary browser profile in said content browser for enabling the requested web application;
    loading said requested web application to said content browser using the created customized temporary browser profile in lieu of a default browser profile in the content browser; and,
    deleting said created customized temporary browser profile in temporal proximity to said loading step.

11. The machine readable storage of claim 10, further comprising the steps of:
    receiving wrapper logic in said content browser; and,
    executing said wrapper logic to configure said customized browser profile and to apply said customized browser profile to said content browser.

12. The machine readable storage of claim 11, further comprising the steps of:
    configuring said customized browser profile to permit file system access; and,
    applying said customized browser profile to said content browser.

13. The machine readable storage of claim 12, wherein said configuring step further comprises the step of further configuring said customized browser profile to enable scripts in said content browser.

14. The machine readable storage of claim 12, wherein said configuring step further comprises the step of further configuring said customized browser profile to permit access to an internal application programming interface (API) for said content browser.

15. The machine readable storage of claim 12, wherein said configuring step further comprises the step of further configuring said customized browser profile to enable frames in said content browser.

16. The machine readable storage of claim 12, wherein said configuring step further comprises the step of further configuring said customized browser profile to disable security warnings for said content browser.

17. The machine readable storage of claim 11, further comprising an additional set of instructions for causing the additional step of applying a pre-programmed look-and-feel to said content browser.

18. The machine readable storage of claim 17, wherein said step of applying a pre-programmed look-and-feel comprises the step of applying a content style sheet to said content browser.

* * * * *